Jan. 16, 1934. R. E. DOWD 1,943,887
SHOCK ABSORBING STRUT FOR AEROPLANES
Filed Jan. 8, 1929    3 Sheets-Sheet 1
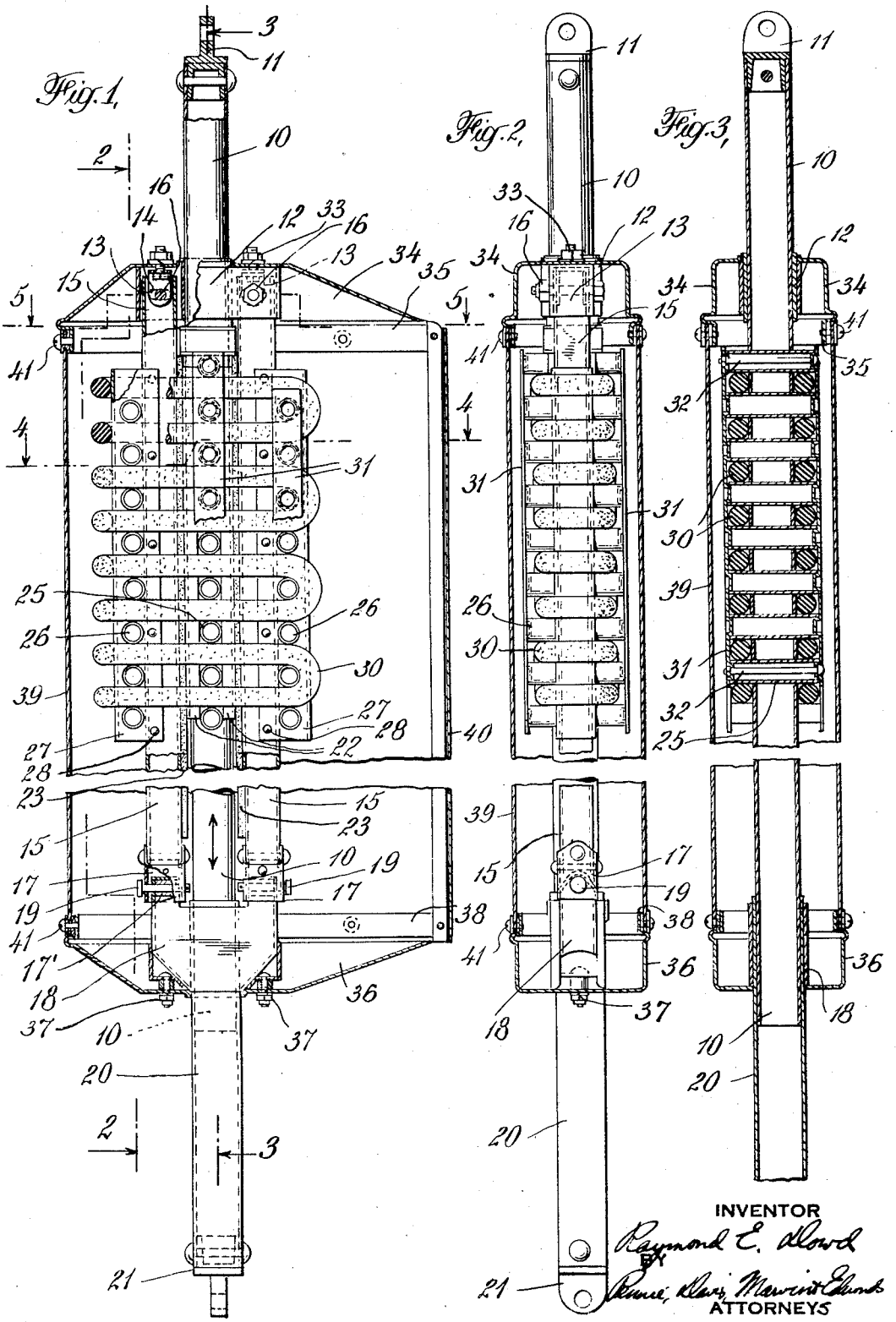

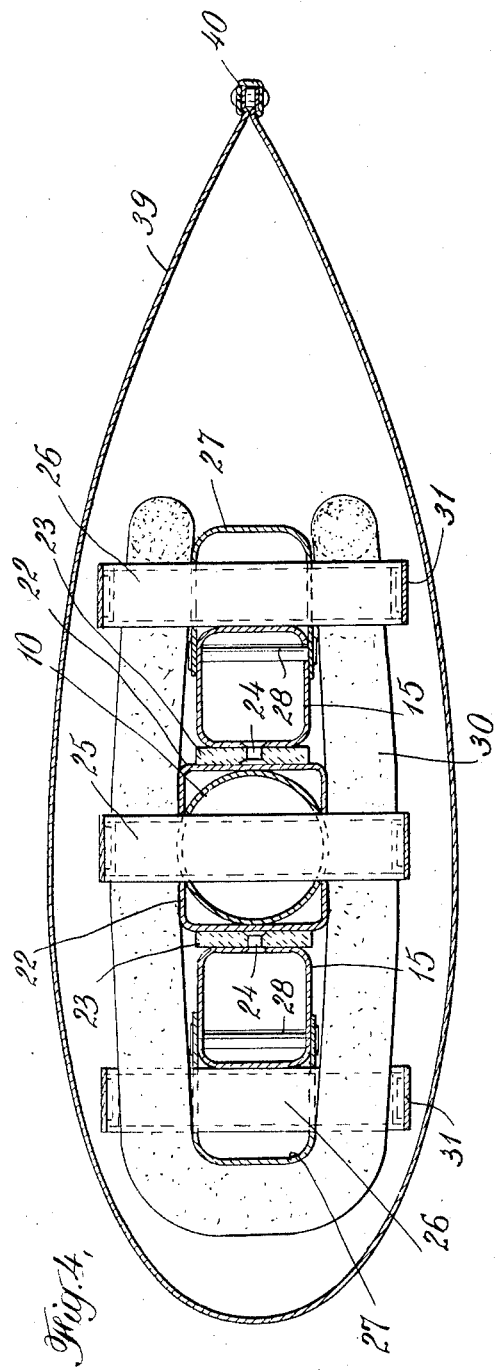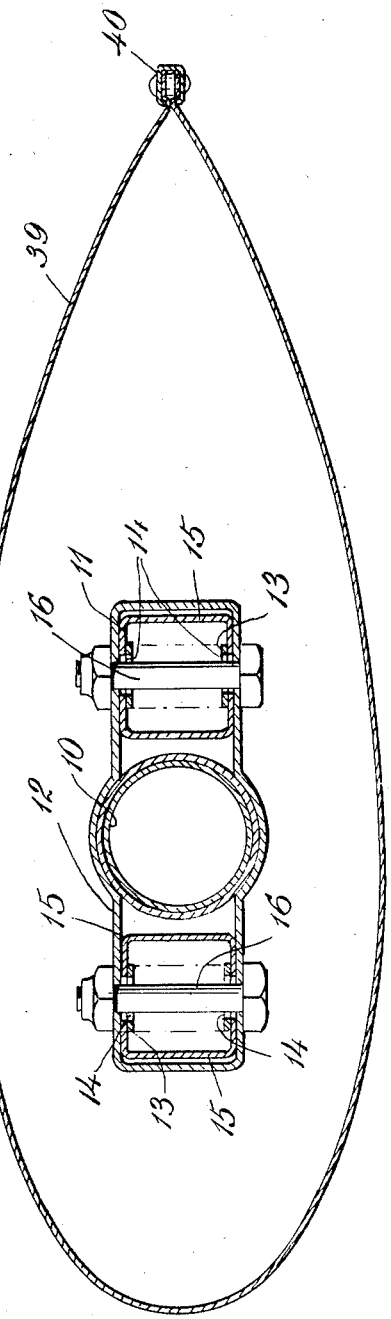

Jan. 16, 1934. R. E. DOWD 1,943,887
SHOCK ABSORBING STRUT FOR AEROPLANES
Filed Jan. 8, 1929  3 Sheets-Sheet 3
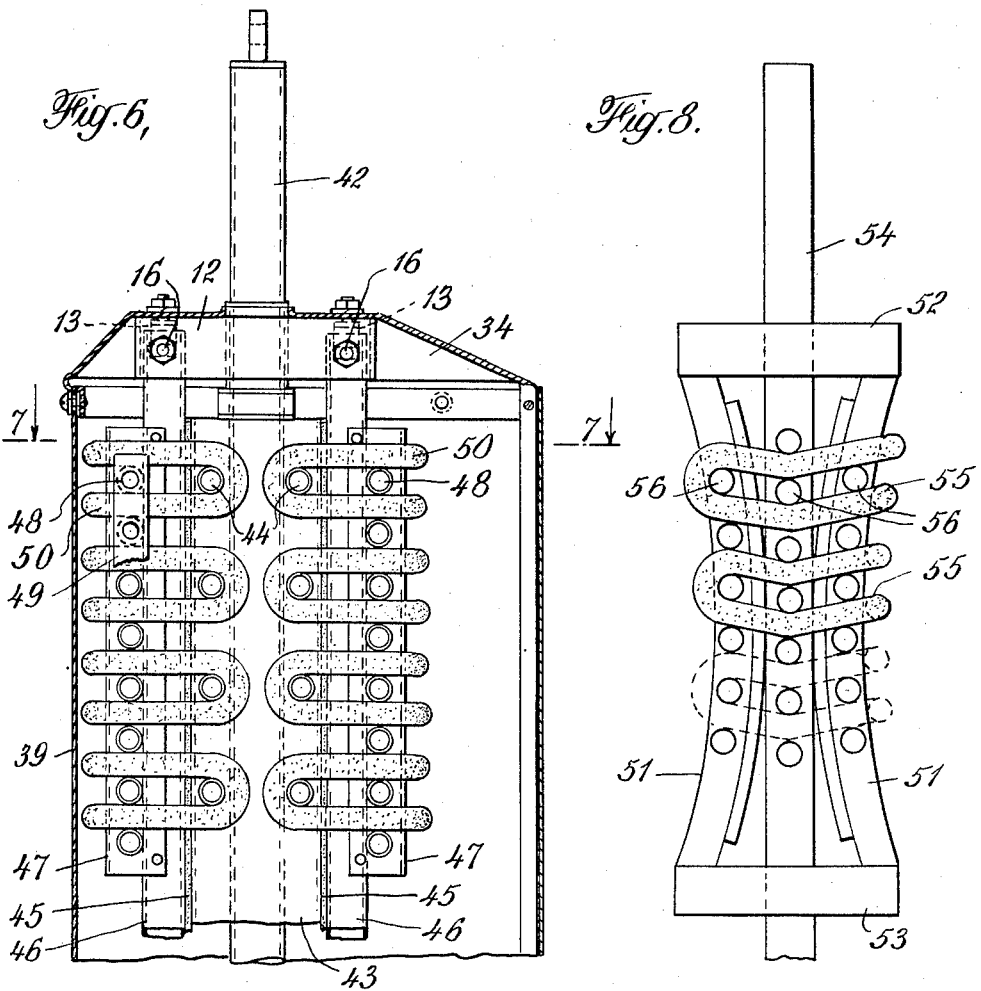
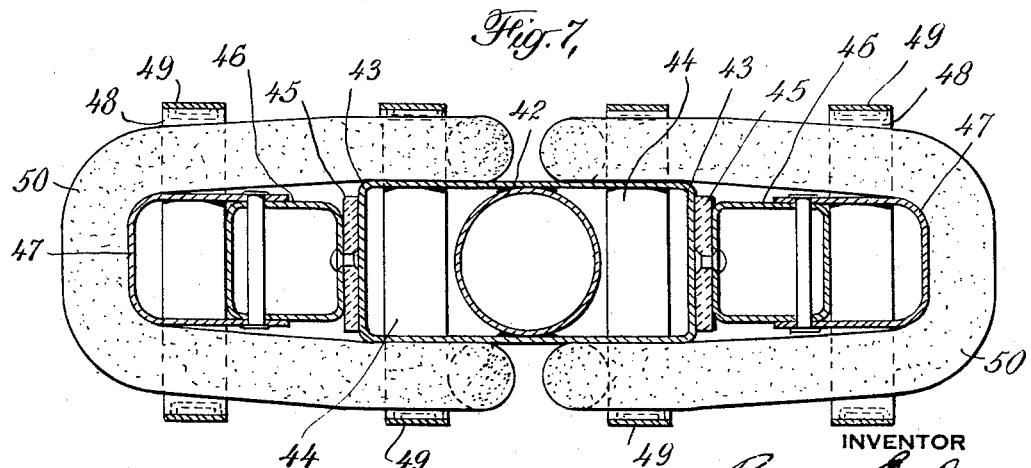

Patented Jan. 16, 1934

1,943,887

UNITED STATES PATENT OFFICE 1,943,887

SHOCK ABSORBING STRUT FOR AEROPLANES

Raymond E. Dowd, Staten Island, N. Y., assignor to The Russell Manufacturing Company, Middletown, Conn., a corporation of Connecticut Application January 8, 1929. Serial No. 331,102

17 Claims. (Cl. 267—9)

This invention relates to shock absorbing means for aeroplanes and has particular reference to a landing gear for aeroplanes in which struts are employed embodying shock absorbing means, so that the sudden shocks and jars incident to landing, take-off and taxiing are not transmitted to the body of the craft.

The problem of providing shock-absorbing means for aeroplanes has been attacked from many angles and has only been partially solved by applying the principles of the art as obtained by experience in developing adequate shock-absorbing devices for automobiles and other road vehicles. However, the problem of absorbing shocks in an aeroplane is vastly different than the problem of absorbing running shocks in an automobile for the following principal reasons. Automobile shock absorbers are under load at all times and the variations in load lie well within ascertainable and well-defined limits, whereas in an aeroplane, the load suddenly decreases from maximum to minimum when taking off, increases from minimum to maximum plus the shocks and jars when landing, and varies within wide limits when taxiing because of the varying air lift upon the wings and planes with respect to which the wheels and landing gear vibrate as they encounter field irregularities. Accordingly, for use on an aeroplane, a shock absorber capable of supporting loads varying suddenly within a wide range is required.

This requirement has been met with considerable success by employing live rubber blocks, bands, strands and the like for the resilient members, but live rubber alone yields too much at times because of the great flexibility required of it. For example, upon landing the rubber is required to yield to its maximum allowable limit, and the consequent rebound is proportionally great, causing the craft to bounce and roll excessively at a time when an attempt toward rolling stability is the principal object. Attempts have been made to overcome this objectionable rebound by providing auxiliary stops, springs, dash-pots, snubbers and the like, but these arrangements are either too sudden or slow-acting in operation, so that much of the desired shock-absorbing action is lost. Also these arrangements are objectionable during taxiing for the reason that they offer considerable resistance to the rapid yielding and as rapid recovery required of the shock-absorber when the craft is moving rapidly over a field having irregularities of all kinds and sizes. In short, these stops, springs, dash-pots, snubbers and the like do not operate in proportion to the load application or action of the yielding members in the shock absorber, but on the contrary, they act independently and therefore retard action at times when freedom of action is required, and vice versa.

It is the principal object of this invention to provide a shock-absorbing strut for aeroplanes which overcomes the objections to those heretofore employed and offers many new and important advantages. A further object of the invention is to provide a shock-absorber for aeroplanes which employs live rubber as the resilient body and is provided with braking means which operates in proportion to the degree of yield of the rubber and to the load, whereby the objectionable rebound upon landing is eliminated and yet the rubber is free to flex and recover naturally in response to small vibrational movements of the landing gear in which the shock absorber is employed without interference by the braking means. Another object of the invention is to provide an aeroplane shock absorber which is light in weight and yet is capable of supporting heavy loads, one in which the load supporting properties may be altered at will merely by substituting rubber members of different elastic properties, one in which the resilient effect of the rubber is greatly amplified per unit weight and area, and one which requires little or no inspection and repair, is fool-proof, has a long life, and is always in operating order under all and any conditions of use, whether landing upon, taking off from, or taxiing across unknown or familiar ground.

These objects are obtained in the preferred embodiment of the aeroplane shock-absorber by making the shock-absorber an element of the landing gear, and in the form of a landing strut in particular. This preferred embodiment of the shock-absorbing landing strut preferably takes the form of a single rod or tube connected to the fuselage or other portion of the craft, this rod or tube being arranged to slide longitudinally between a pair of stationary rods or tubes mounted in cross-heads and connected to the landing wheel axle, skid or the like. One or both of these stationary rods are mounted in the cross-heads for limited bending or bodily movement toward each other and toward the sliding rod, and a frictional surface such as a strip of brake material is interposed between at least one stationary rod and the sliding rod and is preferably secured to the stationary rod for frictional engagement with the sliding rod. On the stationary and sliding rods is mounted a series of pins, pegs, hooks or other anchorages or securing means about which a plurality of endless bands of live rubber are whipped, each band being wrapped transversely around one side of the rod combination to the other so as to engage at least one pin or the like upon each stationary and sliding rod. Thus the bands are wrapped transversely in parallel around the rods from one side to the other so that movement of the sliding rod is restrained by the rubber bands which flex in proportion to the load, and the flexure of the bands causes the stationary rods to be pressed against the sliding rod so that the interposed braking material retards the movement of the sliding rod. Furthermore, the bands are arranged between the stationary rods and transversely of the direction of the applied load so that they produce a lateral tension under load which draws the rods into the desired frictional engagement with the slider to an extent which compensates for the loss in their normal lateral tension caused by their angular displacement under load. Because of this arrangement, the greater the rubber tension the greater the braking action, so that the retardation is proportional to the load and to the rubber flexure. Accordingly, when landing, the tendency of the rubber to flex to the maximum allowable limit under the suddenly applied maximum craft load is retarded to a substantial degree but gradually by the braking action. On the other hand the vibrations of the landing wheels or the like while the craft is taxiing over an irregular field are retarded only slightly so that the rubber may flex and recover rapidly whereby none of the taxiing vibrations and shocks are transmitted to the craft. Thus the objectionable rebound of the rubber is eliminated where necessary, but the prompt recovery of the rubber is not interferred with where it is desired. If it is desired to maintain a constant frictional pressure between the stationary sliding rods a rubber band may tensionally connect the stationary rods without connection with the slider.

Although a preferred embodiment of the invention has been described, several modifications in structure and arrangement of the elements securing the desired retarded shock-absorbing action described are possible and feasible, and these modifications as well as the novel details of construction of the new apparatus will be more readily understood upon examination of the accompanying drawings, in which Figure 1 illustrates a side elevation of the preferred embodiment of the new shock-absorbing strut for aeroplanes, the housing of which is partially broken away to expose the details of construction;

Fig. 2 is a longitudinal section taken along the line 2—2 of Fig. 1;

Fig. 3 is another longitudinal section taken along the line 3—3 of Fig. 1;

Figs. 4 and 5 are transverse sections taken along the lines 4—4 and 5—5, respectively, of Fig. 1;

Fig. 6 is an elevation of a modified form of the shock-absorbing strut;

Fig. 7 is a transverse cross-section of the same, showing the details of construction as seen along line 7—7 of Fig. 4; and Fig. 8 is a diagrammatic sketch of an alternative construction of the new device.

In these drawings, numeral 10 designates a tube formed of some light and strong material such as chrome-molybdenum steel, the upper end of which is fitted with a ferrule 11 provided with an eye for suitable pin attachment to the fuselage or some other part of an aerial craft, such as an aeroplane in particular. This rod 10 passes slidingly through a cross-head 12 fitted with a pair of integral yokes 13 each provided with opposite bolt or rivet holes. Secured in the yokes 13 of cross-head 12 are a pair of spaced tubes 15, preferably of square or rectangular cross-section and also formed of chrome-molybdenum steel or the like. The upper ends of these tubes 15 are provided with oversize holes or lateral slots 14 and are mounted in yokes 13 by means of bolts 16. Although securely mounted in yokes 13, these tubes 15 are slidable laterally therein because of the enlarged holes or lateral slots 14, so that tubes 15 are capable of limited bodily movement in a lateral direction. The lower ends of tubes 15 are fitted with socket ferrules 17 fitting loosely over studs 17' formed upon either side of bottom yoke 18, and these ferrules 17 are secured in position by means of pins 19, passing through an eye formed in each stud 17'. The fit between studs 17' and the ends of rods 15 is such that rods 15 are allowed a limited bodily movement in a lateral direction toward each other, as at their upper ends, whereby rods 15 as a whole may move toward each other, and consequently, toward sliding rod 10 interposed between them, but are relatively immovable longitudinally. Lower cross-head 18 terminates in a through tube 20 in which the lower end of sliding rod 10 telescopes. The lower end of cross-head tube 20 is fitted with a ferrule 21 having an eye for pin attachment to the landing wheel axle, skid or the like.

As shown particularly in Fig. 4, sliding tube 10 is fitted with flanges 22 of channel-shaped cross-section which are preferably welded around tube 10. The flat opposite surfaces of flanges 22 are arranged so as to be spaced from but substantially parallel to the inner flat surfaces of stationary tubes 15. These inner flat surfaces of stationary tubes 15 are fitted with one or more frictional members 23 which may be conveniently made of brake fabric or composition, and which are secured by rivets 24 or otherwise fastened to the flat inner surfaces of stationary tubes 15 in the manner shown. These friction members 23 normally engage the flat surfaces of the flanges 22 of sliding tube 10, and, as pointed out above, stationary tubes 15 are relatively loosely mounted in cross-heads 12 and 18 so as to be bodily movable laterally toward and from the flanges 22 of sliding tube 10, so that the friction material will engage the flanges 22 of sliding tube 10 with variable frictional effect depending upon the pressure applied thereto by stationary tubes 15.

Also as shown in Fig. 4, tubular pins 25 are inserted through sliding tube 10 so as to project from opposite sides thereof. Corresponding pins 26 are inserted through flanges 27 secured to the outer edges of stationary tubes 15 by means of rivets 28, welding or other fastening means not shown. By this arrangement the aircraft load supported by the upper unperforated portion of sliding tube 10 is transmitted by means to be described to unperforated stationary tubes 15, which in turn transmit the load to lower cross-head 18 and its tube 20, attached to the remaining landing gear or the like. It will be seen that the load is removed from tube 10 above the point where this tube is perforated for the reception of pins 25. Thus, an exceptionally strong structure for the load-supporting parts may be obtained without involving the weakness imposed by the pins 25 inserted through these tubes, although it is to be understood that pins 25 may be welded upon the outer surfaces of the tubes without passing through them, whereby perforation of the rods or any appurtenant parts thereof is entirely avoided.

As shown particularly in Figs. 1 to 4, inclusive, endless live rubber rings or bands 30, which are normally under tension, are bound around the sliding and stationary tube combination 15—10—15 from one side thereof to the other, whereby each band 30 is used twice, that is, on opposite sides of the sliding and stationary tube combination 15—10—15, to perform double service and accordingly reduce the amount of rubber required and the space which would ordinarily be occupied thereby as well as the weight. Specifically, one bight of each of these endless bands 30 may be hooked over one of the pins 26 of one of the stationary tubes 15, passed over pin 25 of sliding tube 10, over pin 26 of the opposite stationary tube 15, wrapped around this opposite stationary tube 15, passed over the opposite end of pin 26 thereof, over the opposite end of pin 25 of sliding tube 10, and finally hooked by its end or side over the opposite end of pin 26 of the first stationary tube 15. These endless rubber bands 30 have definite physical characteristics, and, although four have been illustrated in Figs. 1 to 3, as many of one kind may be used as are required to support the load or a portion of the load of the aircraft. Obviously, bands having greater or less elasticity or other physical characteristics may be used for different requirements, and several bands of different characteristics may be used upon the same strut if desired. For example, the strut may be made in the standard sizes and be arranged for the reception of a definite number of bands, and sets of bands having different physical characteristics may be supplied with each strut, so that when the strut is to be adapted for use with craft of considerable weight, heavier and stronger bands will be emplaced thereon, and vice versa.

These rubber bands or rings 30 may be held in position by keepers 31 formed of sheet metal and having spaced cups which fit into the ends of pins 25 and 26 as shown particularly in Figs. 2, 3 and 4. These keepers 31 may be conveniently secured in position to span the series of pins 25 and 26 by means of elongated bolts 32 passing through the hollow end pins 25 or 26 of each row, so that the heads and fastening nuts of these bolts 32 lie flush with or below the surface of the keepers 31, in the manner shown particularly in Fig. 3.

Mounted on upper cross-head 12 by means of bolts or studs 33 is an end plate 34 having an aerofoil cross-section and provided at its lower edge with a flange 35. A similar end plate 36 is mounted on lower cross-head 18 by means of bolts or studs 37, this end plate 36 also having a flange 38 at its upper edge. Wrapped around flanges 35 and 38 of end plates 34 and 36 is a plate 39 of light, flexible material, preferably sheet aluminum, the free ends of which are joined by a clip 40 as shown in Figs. 4 and 5, this clip 40 being secured in place by rivets or other fastening means in the manner shown. The upper and lower edges of housing plate 39 are secured to flanges 35 and 38 respectively, by means of screws 41, tapped into threaded bushings spun or otherwise mounted in or upon the upper and lower edges of housing plate 39. It will be seen that the housing thus mounted takes the form of an aerofoil as shown particularly in Figs. 4 and 5, whereby wind resistance of the shock-absorbing landing strut as a whole is minimized. The relatively moving parts of the strut are also protected by the housing thus formed, and the liability of damage because of dirt and grit, and deterioration of the rubber because of the possibility of oil leakage thereon are eliminated.

In Figs. 6 and 7 are illustrated a modified form of shock-absorbing strut in which greater strength is obtained for heavier loads or larger craft, and in which the standard sized rubber rings or bands may be employed in parallel series and in greater number. A novel construction differing from the first arrangement is also disclosed. For the purpose of brevity, the parts of this second or modified form which are substantially identical with the parts of the first arrangement shown in Figs. 1 to 5, inclusive, are not repeated. In order to provide great strength to the central sliding tube 42, it is maintained imperforate throughout its entire length, and is made extremely rigid by lateral flanges 43 which extend further in a lateral direction than corresponding flanges 22 on tube 10 shown in Fig. 4, and through which the tubular pins 44 are inserted, a row in each flange 43, as shown particularly in Fig. 7. The flat outer surfaces of flanges 43 are engaged by the friction strips 45 secured to the inner flat surfaces of stationary tubes 46 mounted by loose pin connections to the crossheads for limited lateral movement in the same way that the tubes 15 are mounted in the first embodiment shown in Figs. 1 to 5, inclusive. These stationary tubes are also fitted with outside flanges 47 through which tubular pins 48 are inserted, thus avoiding piercing tubes 46 for this purpose and impairing their strength.

The live rubber rings or bands 50 are arranged upon the tube organization 46—42—46 in a novel way, which consists in hooking one side or end of a band 50 over one end of pin 44 on the slider 42—43, passing this band over one end of pin 48 on stationary tube 46—47, looping the band around this stationary tube, over the opposite end of pin 48, and finally hooking the band over the opposite end of pin 44 on slider 42—43. Thus each band is whipped around one of the stationary tubes 46—47 from one side of slider 42—43 to the other. The bands 50 are accordingly arranged in parallel series along each side of the strut and may be of the same standardized dimensions as those employed on the first embodiment shown in Figs. 1 to 5 inclusive. This arrangement enables more of these bands to be used as well as bands of larger diameter and stronger or under greater tension. Keepers 49 may be employed to keep these bands in place, in the manner described.

Shown diagrammatically in Fig. 8 is an alternative strut of the same general form as those described, but in which the stationary members or tubes 51 are not loosely mounted in the crossheads 52 and 53 to permit them to have a limited bodily movement in a lateral direction, but, on the contrary, these stationary members or tubes 51 are rigidly mounted at their ends in cross-heads 52 and 53 and are so made that they may be bent toward each other to bear frictionally upon sliding tube 54 inserted between them. The rubber bands 55 and pins 56 are arranged in the manner illustrated in Fig. 1, although it is obvious that the system of Figs. 6 and 7 may be employed in a similar way.

In operation, assuming that lower ferrule 21 of Fig. 1 is connected to a landing wheel axle, skid or the like, and that ferrule 11 is connected to the craft and that the craft is landing, the shock of the landing load will cause sliding tube 10 to move longitudinally downward between stationary tubes 15. This movement of sliding tube 10 is permitted resiliently by rubber bands or rings 30, and as the tube 10 slides further, the tension on bands 30 is increased so that they draw together the laterally movable tubes 15 to press friction strips 23 upon the engaging surfaces of sliding tube 10. This frictional pressure resists and retards further movement of slider 10, and the degree of this frictional pressure depends upon the tension of bands 30, which in turn depends upon the extent of movement, which in turn depends upon the force of the applied load. Thus it follows that the braking action is proportional to the load and the degree of relative movement between slider 10 and the stationary strut parts, which is the ideal situation. Being under the influence of this braking action, slider 10 is restrained from returning suddenly in response to the recovery of the rubber, so that no sudden rebound can occur, but a gradual return which is as gradual as the original movement under load, this gradual movement having been obtained by the gradual application of the braking action. Furthermore, the degree of braking action being dependent upon the degree of stretch of the rubber which is dependent upon the degree of movement of the slider 10, it will be seen that the rubber absorbs slight shocks and vibration without retardation by the braking action for the reason that the throw of the slider is comparatively short and the degree of rubber stretch is comparatively small. Thus in taxiing, when the craft is frequently partly floating in the air, the vibrations or shocks caused in the landing gear by the irregularities of the field are completely absorbed by the rubber before they reach the craft above.

Accordingly, the braking action is controlled by the shock-absorbing rubber which thus performs two functions, but the braking action may be independently controlled by auxiliary means such as springs interposed between the sliding and stationary tubes or rods, which tend to keep them frictionally apart until a predetermined load is reached when the springs are overcome by the increased tension on the rubber to allow the braking action to take place in the manner described. In this connection, it may be pointed out that the invention is not limited to the use of live rubber bands, although they are preferred, but springs and other tension devices may also be used to obtain the braking, shock-absorbing action described.

In the alternative arrangement shown diagrammatically in Fig. 8 the stationary tubes 51 are bent inwardly to cause the friction strip attached thereto to frictionally engage slider 54 when slider 54 moves longitudinally to vary the tension in the rubber bands 55. This flexing of stationary tubes or rods 51 is shown exaggerated and the degree of their flexure depends upon the degree of rubber tension, whereby the braking action is proportional to the load, in the manner described. Obviously, this flexible stationary tube arrangement might be combined with the loose or bodily movable tube arrangement such as by making one end of the flexible tubes rigid and allowing limited movement of the other ends, and the like.

The shock absorber shown in Figs. 6 and 7 operates in much the same way, the arrangement of the doubled bands 50 providing for great strength and supporting large loads, so that it is particularly adaptable for large and heavy craft. It is obvious that this modification as well as the others is capable of being used under both tensional and compressional loads with equal facility, as it is double acting.

It will be seen that the self-braking shock absorber offers many important advantages over those heretofore in common use, and lends a greater range of usefulness to aircraft by facilitating landing, taxiing and taking off from and upon fields of practically any kind, insures greater comfort to the passengers and operators, and protects the craft generally from damaging shocks and vibrations. The invention also provides a compact, strong and effective construction for aeroplane struts, and discloses a novel and economical use of rubber whereby the rubber is employed to best advantage to procure resilient effects of great scope and utility. While several preferred embodiments of the invention have been illustrated and described, it is to be understood that the invention is not limited to these embodiments but may be modified extensively within the scope of the invention. For example, the novel rubber arrangement and strut construction may be employed in connection with a dashpot, snubber, springs or like retarding devices instead of the variable braking arrangement described, or in addition to the variable braking arrangement. Similarly, the variable braking arrangement described might be associated with some other resilient or elastic shock-absorbing means or medium instead of rubber or different rubber arrangements might be employed with equal facility.

In each form of the invention relatively movable members 15, 51 and 22, 54 are arranged in relatively fixed lateral relation and this term is employed in certain of the claims, but it is to be understood that this term does not mean that the outer members are absolutely fixed laterally but that they are substantially fixed, having a sufficient degree of play to provide for the variable frictional contact between them as they move relatively longitudinally under load.

I claim:

1. In a shock absorber, the combination of a pair of longitudinally movable members arranged in relatively fixed lateral relation, an endless elastic element, means securing the opposite bights of the element to one member to form a double loop around the second member, and means attaching the looped element to said second member.

2. In a shock absorber, the combination of longitudinally movable members arranged in relatively fixed lateral relation, an endless band of elastic material, means securing opposite sides of said band to one of said members to form a double loop around said second member, and means attaching the double loop of the band to said second member.

3. In a shock absorber, the combination of longitudinally movable members arranged in relatively fixed lateral relation, an endless band of elastic material, said band being passed around one member to form a double loop with opposite sides engaging the other member, and means on said one member attaching the said double loop of the band thereto, and means on said other member attaching the said opposite sides of said band thereto.

4. In a shock absorber, the combination of parallelly movable members, an endless band of elastic material, and anchorages on opposite sides of both members, the opposite sides of said band being hooked over the anchorages on opposite sides of one member and wrapped around the other member in a double loop passing on either side of the anchorages thereof.

5. In a shock absorber, the combination of a pair of relatively stationary parallel members, a third member slidable longitudinally between said stationary members, an elastic loop secured at opposite sides to one of said stationary members and whipped around the second stationary member to cross said slidable member, and means on said second stationary and said slidable member connecting the band thereto.

6. In a shock absorber, the combination of a pair of laterally movable parallel members, a third member slidable longitudinally between said parallel members in frictional engagement therewith, elastic means arranged transversely of said three members, and means connecting said elastic means to each member, said elastic means being adapted to move said parallel members laterally to vary their frictional engagement with the slidable member in proportion to the movement thereof.

7. In a shock absorber, the combination of a pair of laterally movable parallel members, a third member slidable longitudinally between said members, friction material between the surfaces of the slidable member and the adjacent surfaces of the parallel members, and elastic means jointly crossing said three members and secured thereto, said elastic means being adapted to move said parallel members laterally to vary the frictional effect of said material in response to longitudinal movement of said slidable member.

8. In a shock absorber, the combination of spaced cross-heads, parallel spaced members mounted loosely at opposite ends to said cross-heads, a third member mounted for longitudinal movement between said members in variable frictional engagement therewith, and elastic means spanning said parallel members and connected to said third member, whereby movement of the third member causes said means to move said parallel members to vary their frictional engagement with the third member.

9. In a shock absorber, the combination of spaced cross-heads, parallel spaced members mounted loosely at opposite ends to said cross-heads, a third member mounted for longitudinal movement between said members, friction material between said third member and each parallel member for engagement with said third member and transverse elastic members connecting the parallel members and connected to the third member, whereby movement of the third member moves the parallel member to vary the pressure of said friction material thereon.

10. In a shock absorber, the combination of spaced cross-heads, parallel spaced members mounted loosely at opposite ends to said cross-heads, a third member mounted for longitudinal movement between said members, said third member being in frictional engagement with each parallel member, fastening devices mounted on said parallel and third members, and a live rubber band jointly engaging the fastening members under tension, whereby movement of the third member causes the band to move said parallel members to vary their frictional engagement with said third member.

11. In a shock absorber, the combination of spaced cross-heads, parallel spaced members mounted loosely at opposite ends to said cross-heads, a third member mounted for longitudinal movement between said members, flanges on said members, pins in said flanges, and elastic material mounted on said pins and connecting said third member with at least one parallel member, whereby movement of the third member moves said last-named parallel member into variable frictional engagement with said third member.

12. In a shock absorber, the combination of spaced cross-heads, laterally deflectable, parallel, spaced members, each mounted at opposite ends in said cross-heads, a strip of friction material secured to the inner surface of each parallel member, a third member inserted through at least one of said cross-heads for longitudinal movement between said parallel members and in contact with said friction strips, fastening means mounted in said parallel and third members, and elastic material mounted on said means and connecting said third member with at least one parallel member, whereby movement of the third member deflects said parallel member into variable frictional engagement with said third member.

13. In a shock absorber, the combination of a pair of laterally deflectable outer members, an inner member longitudinally slidable between said outer members and in frictional engagement therewith, and elastic means connecting each outer member with the inner member, whereby the degree of frictional engagement between said outer members and inner member varies in proportion to the relative movement between them.

14. In a shock absorber, the combination of a pair of outer members, means holding said members against relatively longitudinal movement, an inner member slidable between said outer members and in frictional engagement therewith, and elastic means connecting each outer member with said inner member, whereby relative longitudinal movement between said outer members and said inner member causes said elastic means to draw the outer members into greater frictional engagement with said inner member.

15. In a shock absorber, the combination of a pair of laterally flexible outer members, means rigidly connecting said members together at each end, an inner member longitudinally slidable between said outer members, elastic means flexing the center portions of said outer members inwardly into frictional contact with said inner member, and connections between said means and said inner member, whereby the degree of frictional engagement between the outer members and the inner member varies in proportion to the relative movement between them.

16. In a shock absorber, the combination of a pair of relatively longitudinally movable members, friction material between said members to retard their relative movement, endless elastic bands connecting both members together, said bands being adapted to vary the friction between the members as they move relatively to each other.

17. In a shock absorber, the combination of a pair of relatively longitudinally movable members, said members being in variable frictional engagement with each other, and an endless elastic band anchored by opposite bights to one member and forming a double loop around the other member and secured thereto, said band being adapted to vary the frictional engagement of said members upon relatively longitudinal movement thereof.

RAYMOND E. DOWD.